United States Patent
Suzuki et al.

(10) Patent No.: US 6,467,148 B1
(45) Date of Patent: Oct. 22, 2002

(54) METHOD OF PRODUCING METAL BAND OF METAL BELT FOR BELT-TYPE CONTINUOUSLY VARIABLE TRANSMISSION

(75) Inventors: Masayuki Suzuki; Akira Maruyama, both of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/208,496

(22) Filed: Dec. 10, 1998

(30) Foreign Application Priority Data

Dec. 10, 1997 (JP) .............................................. 9-340347

(51) Int. Cl.[7] .......................... B23Q 3/00; B25B 27/14; C21D 1/56; F16G 1/00; B21D 31/00
(52) U.S. Cl. .............................. 29/464; 29/281; 92/364; 148/606; 269/287; 474/201
(58) Field of Search .......................... 29/464, 466, 281; 474/201, 262, 263, 264; 269/287; 72/363, 364; 148/604, 606

(56) References Cited

U.S. PATENT DOCUMENTS

| | | | |
|---|---|---|---|
| 926,898 A | * | 7/1909 | Rockwell |
| 3,806,379 A | * | 4/1974 | Darr, Sr. |
| 3,922,771 A | * | 12/1975 | Buesink et al. ............... 29/445 |
| 3,977,914 A | * | 8/1976 | Wallner et al. ............. 148/12.4 |
| 4,128,378 A | * | 12/1978 | Otsu et al. ................... 425/445 |
| 5,019,020 A | * | 5/1991 | Van Lith ..................... 474/240 |
| 5,026,436 A | * | 6/1991 | Pohl .......................... 148/12 B |
| 5,152,047 A | * | 10/1992 | Kiojima et al. ................ 29/411 |

FOREIGN PATENT DOCUMENTS

| | | | |
|---|---|---|---|
| JP | 57163750 | * | 10/1982 |
| JP | 58159936 | * | 9/1983 |
| JP | 59089851 | * | 5/1984 |
| JP | 2-225840 | | 9/1990 |
| JP | 09122805 | * | 10/1995 |

OTHER PUBLICATIONS

Kikai Kogaku Binran (Shadan Hojin, Nippon Kikai Gakkai), B1, new editioin issued on Apr. 15, 1987, p. 180.

* cited by examiner

Primary Examiner—S. Thomas Hughes
Assistant Examiner—John C. Hong
(74) Attorney, Agent, or Firm—Foley & Lardner

(57) ABSTRACT

A producing method of a metal band of a metal belt for a belt-type continuously variable transmission includes the following steps of: superposing a predetermined number of blank rings concentrically on one another to constitute a laminated blank rings; fitting the laminated blank rings to an outer periphery of a circle jig made of material having higher thermal expansivity than that of the blank ring; heating the laminated blank rings together with the circle jig; and deforming the laminated blank rings plastically by thermal expansion of the circle jig.

12 Claims, 8 Drawing Sheets

FIG.8

| BLANK RING No. | | R1 | R2 | R3 | R4 | R5 |
|---|---|---|---|---|---|---|
| BEFORE TREATMENT | INNER DIAMETER(mm) | 225.020 | 225.478 | 225.866 | 226.227 | 226.704 |
| | INNER PERIPHERY LENGTH(mm) | 706.921 | 708.359 | 709.578 | 710.721 | 712.211 |
| | DIFFERENCE IN PERIPHERY LENGTHS BETWEEN INNER AND OUTER RINGS(μm) | − | 244 | 25 | −60 | 304 |
| AFTER TREATMENT | INNER DIAMETER(mm) | 225.701 | 226.075 | 226.450 | 226.821 | 227.194 |
| | INNER PERIPHERY LENGTH(mm) | 709.058 | 710.235 | 711.411 | 712.579 | 713.749 |
| | THICKNESS(mm) | 0.186 | 0.186 | 0.186 | 0.186 | 0.185 |
| | DIFFERENCE IN PERIPHERY LENGTHS BETWEEN INNER AND OUTER RINGS(μm) | − | 6 | 9 | 1 | 6 |
| BLANK RING No. | | R6 | R7 | R8 | R9 | |
| BEFORE TREATMENT | INNER DIAMETER(mm) | 227.127 | 227.572 | 227.982 | 228.407 | |
| | INNER PERIPHERY LENGTH(mm) | 713.540 | 714.938 | 716.226 | 717.561 | |
| | DIFFERENCE IN PERIPHERY LENGTHS BETWEEN INNER AND OUTER RINGS(μm) | 134 | 204 | 94 | 141 | |
| AFTER TREATMENT | INNER DIAMETER(mm) | 227.565 | 227.935 | 228.306 | 228.677 | |
| | INNER PERIPHERY LENGTH(mm) | 714.916 | 716.078 | 717.250 | 718.406 | |
| | THICKNESS(mm) | 0.185 | 0.184 | 0.184 | 0.184 | |
| | DIFFERENCE IN PERIPHERY LENGTHS BETWEEN INNER AND OUTER RINGS(μm) | 5 | 2 | 7 | 9 | |

METHOD OF PRODUCING METAL BAND OF METAL BELT FOR BELT-TYPE CONTINUOUSLY VARIABLE TRANSMISSION

BACKGROUND OF THE INVENTION

1. Field of the Invention

The present invention relates to a method of producing a metal band of a metal belt wound around V-shaped pulleys of a belt-type continuously variable transmission and a producing apparatus thereof, more specifically to a producing method and a producing apparatus of metal band which is utilized for connecting a large number of metal blocks constituting the metal belt.

2. Description of the Relevant Art

A belt-type continuously variable transmission using a V-belt and a V-shaped pulley comprising two circular conic disks in which a distance between the two disks is variable is relatively simple in structure, and is inexpensive and thus, is widely utilized.

As a V-belt used in such a belt-type continuously variable transmission, a V-belt as described in Kikai Kogaku Binran (Shadan Hojin, Nippon Kikai Gakkai, new edition issued on Apr. 15, 1987) edition B1, Page 180, has been used as a conventional rubber belt. On the other hands, a so-called metal belt in which a large number of metal blocks are connected through a steel belt (metal band) as described in Japanese Patent Application Laid-open No. 2-225840 has been increasingly used instead of the conventional rubber belt in view of improvement of a tensile strength.

In the above stated relevant art, a lamination typed metal band made of a plurality of metal blanks are utilized for constituting a metal belt which connects a large number of metal blocks to constitute the metal belt. However, the production of the conventional laminated typed metal band is complex and the cost thereof is increased.

SUMMARY OF THE INVENTION

The present invention has been achieved in view of the above problems in the conventional metal band for the belt-type continuously variable transmission and producing method thereof.

Therefore, it is an object of the invention to provide a method of producing and a producing apparatus of a metal band of a metal belt for a belt-type continuously variable transmission, in which the production is facilitated and the cost is reduced.

It is another object of the invention to provide a method of producing and a producing apparatus of a metal band of a metal belt for a belt-type continuously variable transmission, in which a tolerance range of difference in size of adjacent blank rings constituting the metal band is large, selection of the blank rings at the time of assembling is easy, a large-scale store place is unnecessary, the equipment cost and the number of management steps can be reduced, and a metal belt having a high precision can be obtained.

To achieve the above object, according to an aspect of the present invention, there is provided a method of producing of a metal band of a metal belt for a belt-type continuously variable transmission, comprising the steps of: superposing a predetermined number of blank rings concentrically on one another to constitute a laminated blank rings; fitting the laminated blank rings to an outer periphery of a circle jig made of material having higher thermal expansivity than that of the blank ring; heating the laminated blank rings together with the circle jig; and deforming the laminated blank rings plastically by thermal expansion of the circle jig.

On the other hand, according to another aspect of the present invention, there is provided a producing apparatus of a metal band of a metal belt for a belt-type continuously variable transmission, comprising: a circle jig having an outer periphery to be fitted with a laminated blank rings which are concentrically superposed on one another; and a furnace heating the laminated blank rings together with the circle jig, wherein the circle jig is made of material having higher thermal expansivity than that of the laminated blank rings, thereby deforming the laminated blank rings plastically by thermal expansion of the circle jig.

According to the producing method and the producing apparatus of the metal band of the metal belt for the belt-type continuously variable transmission of the present invention, since the plastic deformation is applied to the laminated blank rings based on a difference in thermal expansivity between the circle jig and each of the blank rings, a diameter of the blank ring is increased in a true-circle manner by stress uniformly loaded from its inner peripheral side, and a clearance between the adjacent inner and outer rings is reduced. With this feature, when the blank rings are superposed in fitted to the circle jig, a tolerance range of difference between the outer periphery length and the inner periphery length of the adjacent inner and outer rings is largely increased as comparing with a conventional range of 11 μm or less (0 to 11 μm), and even if the outer periphery length of the inner ring is slightly longer than the inner periphery length of the outer ring for example, such a difference can be allowed.

Therefore, a range of selection of the blank rings is largely widened, and since the stocking term after the production of the blank rings is extremely shortened, the store place is unnecessary, or it is possible to reduce the store place, and the equipment costs and management cost are reduced. Further, the final size of the metal belt is determined by the size and the processing temperature of the circle jig, the precision of the size of the metal belt is enhanced by constantly keeping the size and the processing temperature of the circle jig.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 8 is a view showing a size of each of the blank rings.

DETAILED DESCRIPTION OF THE PREFERRED EMBODIMENTS

Figure 1A:
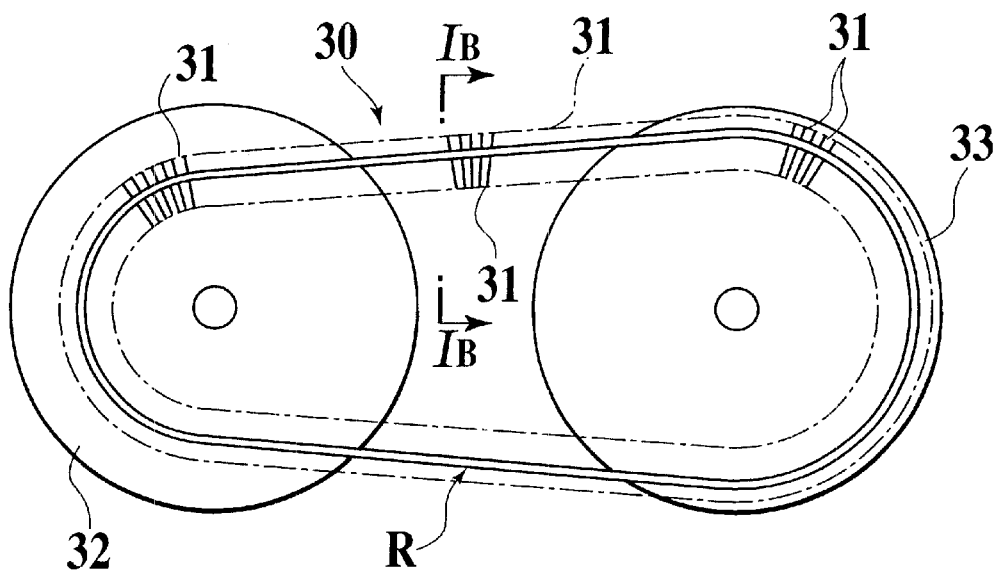
FIG. 1A is an explanatory view for showing a mounting state of a metal belt constituted by a metal band according to the present invention, to pulleys in a belt-type continuously variable transmission.

There will be detailed below the preferred embodiments of the present invention with reference to the accompanying drawings. Like members are designated by like reference characters.

Figure 1B:
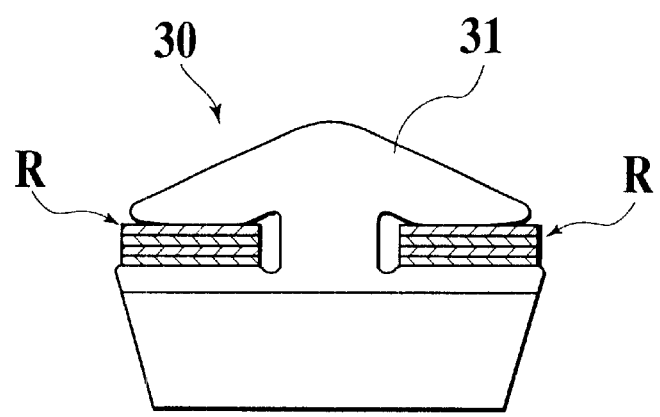
FIG. 1B is an explanatory sectional view of the metal belt showing metal blocks and steel belts of the metal belt shown in FIG. 1A.

FIGS. 1A and 1B show a structure of a metal belt 30 constituted by a metal band according to the present invention, wound around V-shaped pulleys 32 and 33 of a belt-type continuously variable transmission. The illustrated metal belt 30 has a structure in which a large number of metal blocks 31 each having a shape as shown in FIG. 1B are sandwiched between endless steel belts, in other words, metal bands R and R, and the metal belt 30 is wound around the driving and following V-shaped pulleys 32 and 33 as shown in FIG. 1A.

Figure 2:
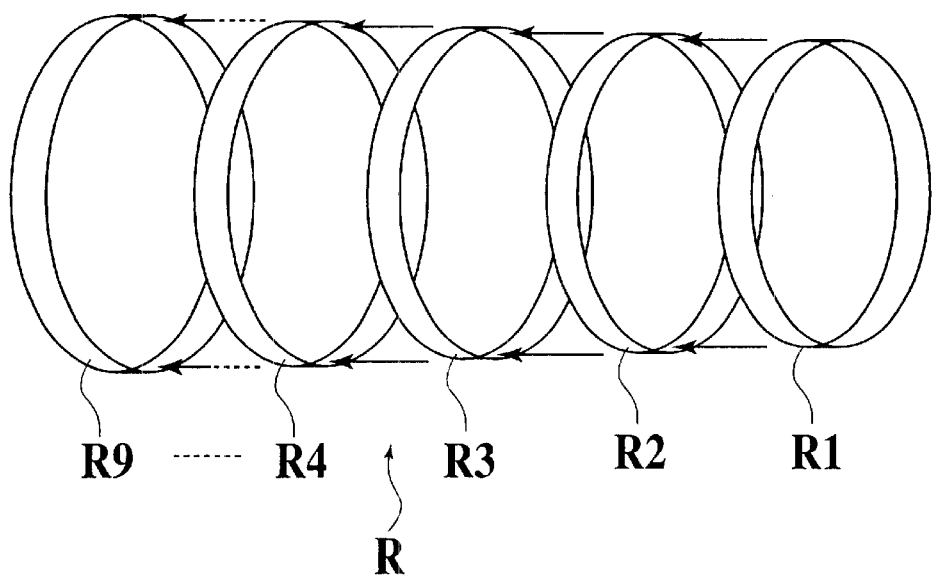
FIG. 2 is an explanatory view showing a manner producing a metal band of the present invention which is made of laminated metal rings and is to constitute a metal belt for the belt-type continuously variable transmission.

The metal band R comprises from couples two to around tens of thin steel rings (although four steel rings shown in FIG. 1B), in other words, blank rings R1 to R9 or more as shown in FIG. 2. Each blank rings R1 to R9 has a thickness of about 0.2 mm. when the metal band R is produced. As shown in FIG. 2, a necessary number of blank rings R1 to Rn whose circumference length (diameters) are stepwisely different are selected, and they are assembled by sequentially fitting one another.

At the time of superposing a predetermined number of blank rings concentrically on one another to constitute a laminated blank rings, it is necessary to select the blank rings R1 to Rn such that a difference between an other peripheral length and an inner peripheral length of adjacent inner and outer rings is $11\mu$ or less. However, it is difficult to control a size of the blank ring R within such a high precision range under the current ring producing method and therefore, sizes of the produced blank rings R are individually measured, and classified into sizes and stocked, and a combination of the blank rings R1 to Rn having sizes within the above-described precision is selected and assembled.

However, in the above-described producing method of the metal belt, it is necessary to precisely measure the size (circumference length) of the blank ring, such a measuring operation is complex, a variation in size of the blank is large, custody time of some blanks is long because the size thereof can not freely be controlled, a store place for keeping the measured blank rings classified into sizes must be large-scale.

Further, for the inventory management of the blank rings classified into sizes, a complicated management utilizing a computer or the like is required. Therefore, the cost of equipment and the management cost are elevated. It has been required to improve the producing method to be facilitated and to reduce the manufacturing costs.

Figure 3A:
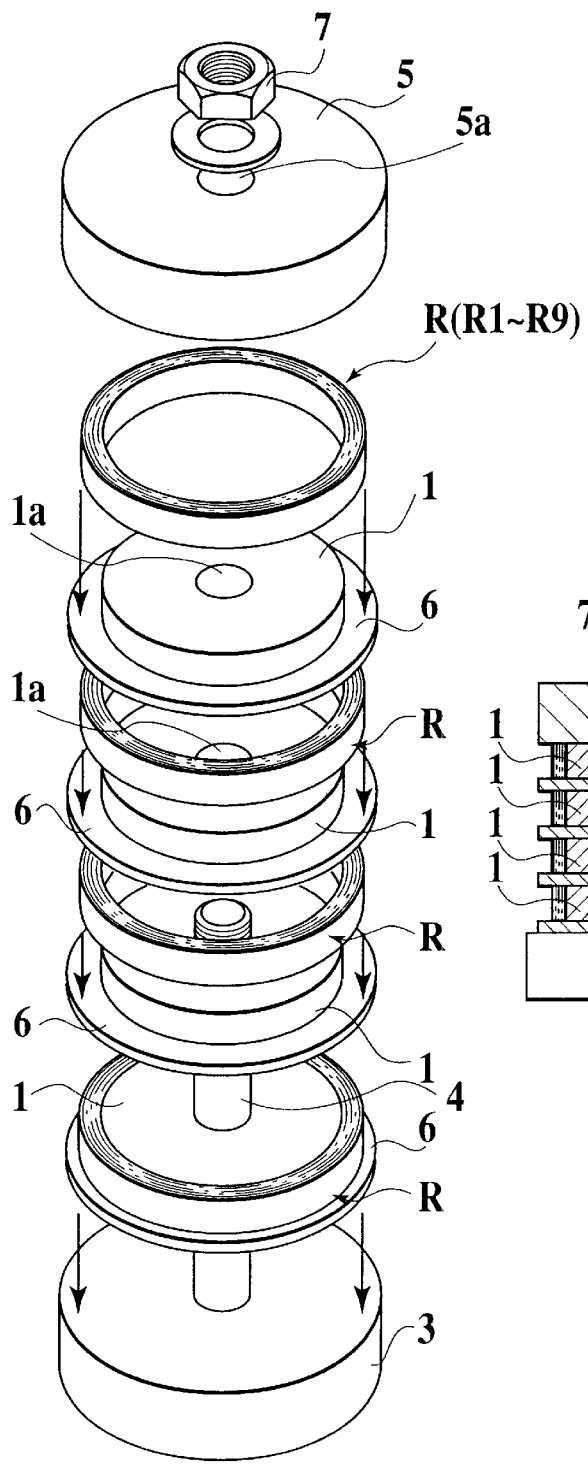
FIG. 3A is an exploded perspective view showing the blank ring set to a circle jig according to one embodiment of the producing method of the belt-type continuously variable transmission of the present invention.
Figure 3B:
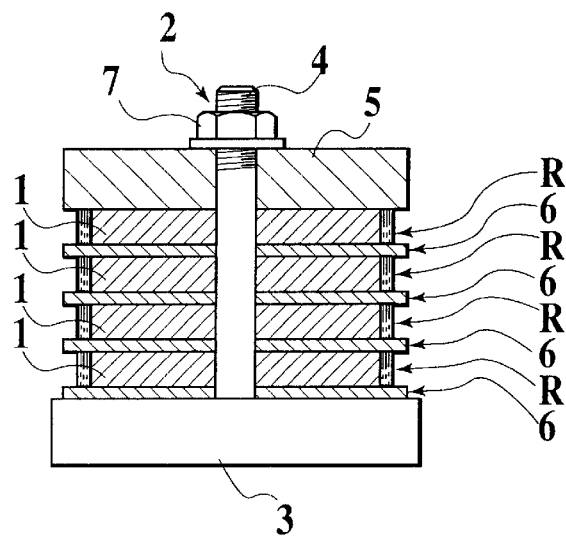
FIG. 3B is an explanatory vertical sectional view showing the laminated blank rings which are set to the circle jig.

In this connection, referring now FIGS. 3A to FIG. 6C, improved method of producing and producing apparatus of the metal band constituting the metal belt according to the present invention will be described hereinafter. FIGS. 3A and 3B show circle jigs used for a method of producing of a metal belt of a belt-type continuously variable transmission according to the present invention, a structure of a jig retainer for collectively setting the circle jigs and a way of setting.

A circle jig 1 shown in the drawings is a disc plate having a diameter of 224.855 mm made of austenitic based stainless steel (JIS SUS304 steel) having a large thermal expansivity, and a predetermined number of blank rings R1 to Rn are superposed and fitted to the outer periphery of the circle jig 1. The circle jig 1 is formed at its central portion with a through hole 1a through which a jig retainer 2 and a shaft 4 which will be described later are inserted.

The jig retainer 2 mainly comprises a thick disc like base block 3, a shaft 4 uprightly provided on a central portion of the base block 3, and a pressure block 5 provided at its central portion with a through hole 5a for the shaft 4.

In this jig retainer 2, four sets of blank rings are simultaneously set such that the shaft 4 passes through four circular jigs 1 with pressure plates 6 interposed therebetween and the pressure block 5, and a nut 7 is threaded to the shaft 4 and fastened. The material of the jig retainer 2 is not specially limited, but it is preferable that the austenitic based steel as the circle jig 1 is used.

The way to produce the metal belt of the belt-type continuously variable transmission from the predetermined number of blank rings R using the circle jig 1 and the jig retainer 2 will be explained below.

First, nine blank rings R1 to R9 produced using maraging steel (18% of Ni steel) as material are selected, and concentrically superposed as shown in FIG. 3A and fitted to the uppermost circle jig 1 in such a manner that the nine blank rings R1 to R9 become and constitute a laminated typed blank rings R1 to R9.

Sizes of the blank rings R1 to R9 and differences of the outer periphery length and inner periphery length of the adjacent inner and outer rings at that time are as shown in FIG. 8. When these blank rings R1 to R9 are selected, blocks which are roughly classified into sizes are selected relatively early. For example, since a blank ring having an inner peripheral length slightly shorter than the outer periphery length of the blank ring R3 was selected as the blank ring R4, the blank ring R3 was fitted to the blank ring R4 in a state where the blank ring R3 was slightly flexed. Since other rings had relatively large difference in inner and outer peripheral lengths (clearances), they could be superposed on one another easily.

In the above case, after the peripheral lengths of the blank rings are measured, and classified into a smaller number of classes than the conventional method, and kept. However, if the deviations of the peripheral lengths of the rings are within a relatively small range, it is possible to eliminate the classification, and to collectively keep all of the blank rings.

As shown in FIG. 3A, other three sets of blank ring R are set to the jig retainer 2 and fixed by the nut 7 and are entered into the thermal treatment furnace and heated at 480° C. for 6 hours, and the blank rings R are subjected to the aging treatment to apply the plastic deformation to the blank rings R by the thermal expansion of the circle jig 1. As a treatment condition at that time, 480±10° C.×3 to 9 hours can be employed.

Figure 4:
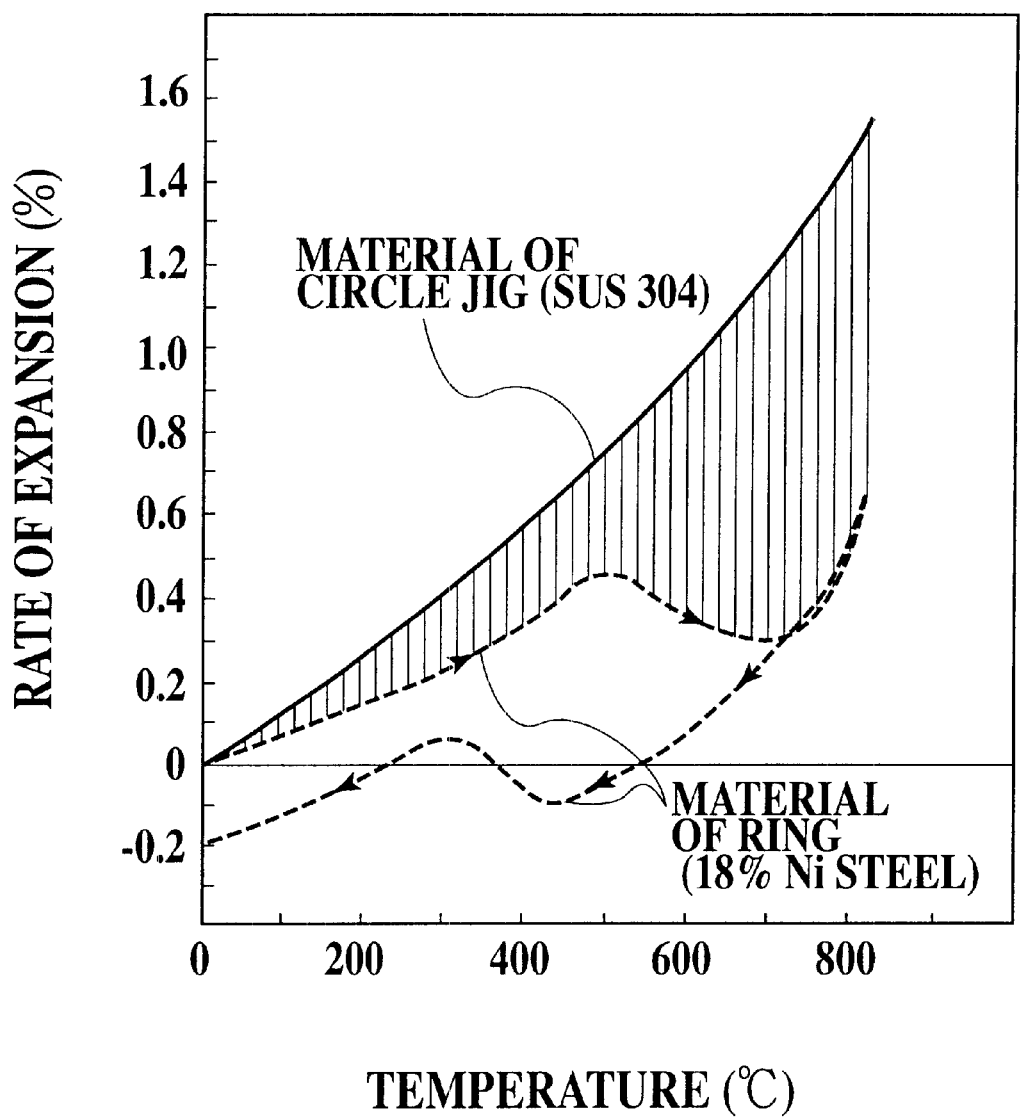
FIG. 4 is a graph showing a difference in thermal expansivity between materials of the circle jig and the blank ring shown in FIGS. 3A and 3B.

FIG. 4 is a graph of thermal expansion of the austenitic based steel (SUS304 steel of the Japanese Industrial Standard) which is the material of the circle jig 1 and the maraging steel (18% of Ni steel) which is the material of the blank ring R, and it can be found in this graph that a difference between both the expansivities becomes a working force applied to the blank ring R. As the results, the laminated blank rings R1 to Rn become a metal band R according to the present invention.

After the temperature of the blank ring R and the jig retainer 2 is lowered to a room temperature, the blank ring R is pulled out from the thermal treatment furnace together with the jig retainer 2, the jig retainer 2 is disassembled to take out the plastically deformed blank ring R, thereby obtaining the metal belt of the belt-type continuously variable transmission. At that time, since the diameter of the blank ring R is increased by the plastic deformation and the diameter of the circle jig 1 is returned to the original size because the temperature of the circle jig 1 is lowered to the room temperature, the blank ring R can easily be detached from the circle jig 1.

Sizes and differences of inner and outer periphery lengths of the blank rings R1 to R9 set to the uppermost circle jig 1 are as shown in Table 1. It was found that clearances between the inner and outer rings or flexure which were relatively large were corrected within 9 μm or less by the plastic deformation due to the thermal expansion of the circle jig 1, and it was confirmed that the metal belt of the belt-type continuously variable transmission having a quality equal to or greater than that of the conventional metal belt.

Figure 5A:
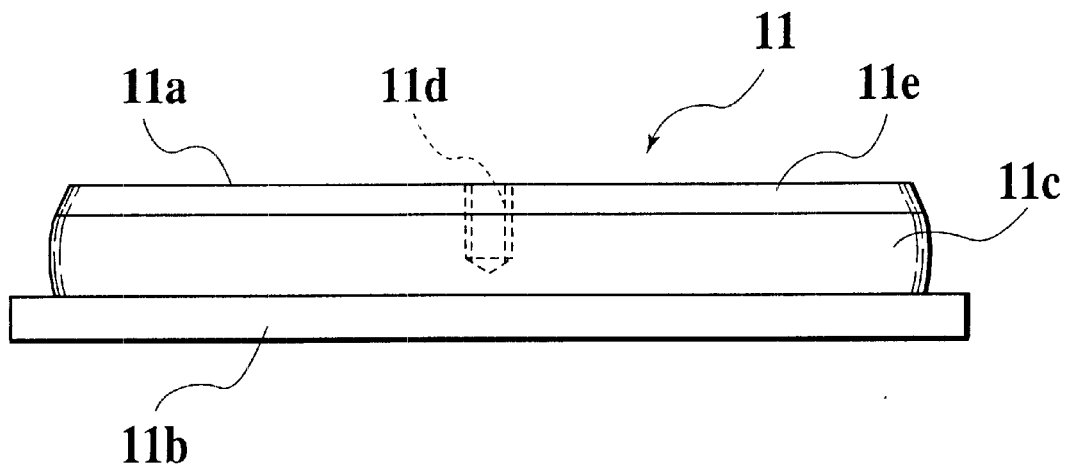
FIG. 5A is a front view showing another example of a shape of the circle jig used for the producing method of the metal belt of the belt-type continuously variable transmission of the present invention.
Figure 5B:
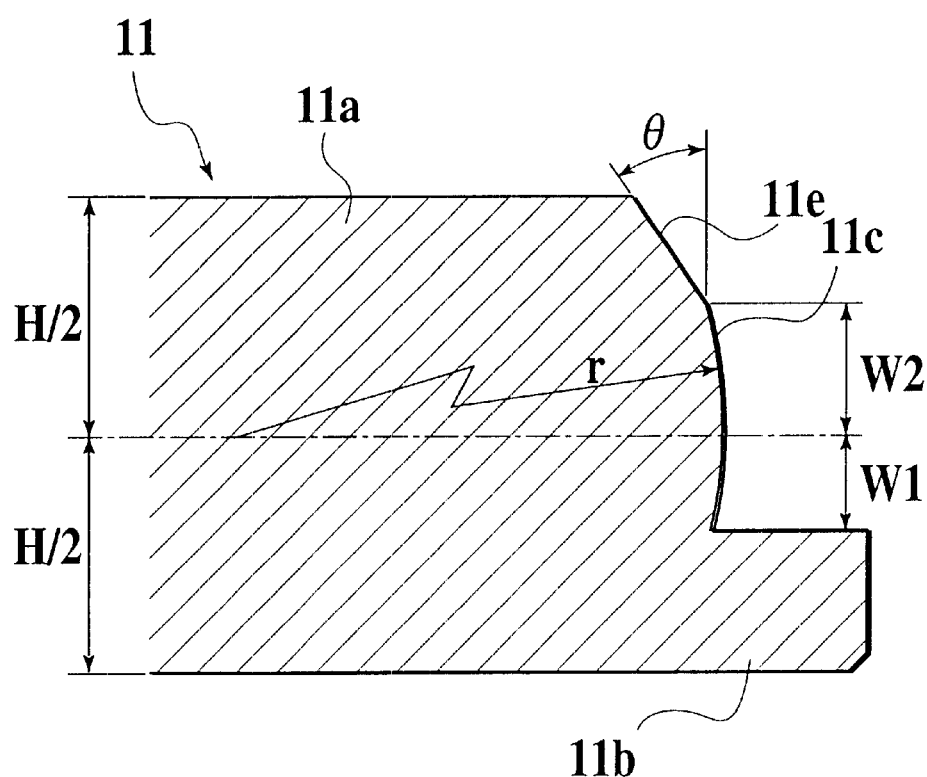
FIG. 5B is an enlarged sectional view showing a size of the circle jig shown in FIG. 5A.

FIGS. 5A and 5B show another example of a shape of the circle jig used for the producing method of the metal belt of the belt-type continuously variable transmission of the present invention.

A circle jig 11 shown in FIGS. 5A and 5B is a jig for a continuous furnace, whereas the circle jig 1 shown in FIG. 3A is a jig for a batch furnace in which a large number of blank rings are set at a time and heated. That is, a set of blank ring are sequentially set to the circle jig 11, and the blank rings R can be continuously heated while the blank rings R pass through the furnace together with the jig 11. With this feature, a continuously automatic operation can be employed.

The circle jig 11 comprises an austenitic based precipitation strengthened type super heat resistance alloy steel (26Ni—15Cr—2Ti—1.3Mo) corresponding to ASTM A286 steel, and is formed into a disk-like plate having a height H of 29 mm and is provided at its lower end in the drawing with a flange 11b having a diameter of 240 mm. As shown in an enlarged manner in FIG. 5B, a jig body 11a is formed at its outer peripheral surface with a crown portion 11c having a curvature radius R of 120 mm. The jig body 11a is also formed at its central portion with a threaded hole lid into which an eye bolt is threaded for hanging the jig 11. A diameter of the jig body 11a is 225.31 mm at a vertex of the crown 11c in accordance with a size of the metal belt of the belt-type continuously variable transmission in this embodiment.

As shown in FIG. 5B, vertical widths of the crown 11c of the jig body 11a are formed such that a width W1 from the center of the plate thickness, i.e., from the vertex of the crown to the lowermost portion is 6.1 mm, and a width W2 from the vertex of the crown to the uppermost portion is 8.0, and a total width is 14.1 mm. Further, a portion of the jig body 11a that is above the crown 11c is formed into a tapered portion 11e of θ=20° such that the superposed blank rings R can easily be mounted to the jig body 11a.

It is preferable that the curvature radius R of the crown is in a range of 60 to 200 mm, an angle of the tapered portion 11e is in a range of 5 to 45°, the width W1 of the crown 11c is one-half of a width of the metal belt of the continuously variable transmission, and the width W2 is 1 to 5 mm greater than one-half of the width of the metal belt of the continuously variable transmission.

Before the circle jig 11 is used, it is subjected to the aging treatment at 730° C. for 16 hours in a vacuum furnace so the circle jig 11 can withstand the above-described aging treatment of the blank ring R, i.e., heating treatment of 480° C.×6 hours.

Referring now to FIGS. 6A, 6B, 6C and 7, another embodiment of a producing apparatus according to the present invention will be described hereinbelow. As shown in FIGS. 6A 6B, 6C and 7, while such a circle jig 11 is transferred by a belt conveyer 53, the blank rings R (R1 to R9) superposed are mounted to the jig body 11a of the circle jig 11 by a robot 57. At that time, since the upper end of the jig body 11a is formed with the tapered portion 11e, the blank rings R can easily be mounted automatically.

Figure 6A:
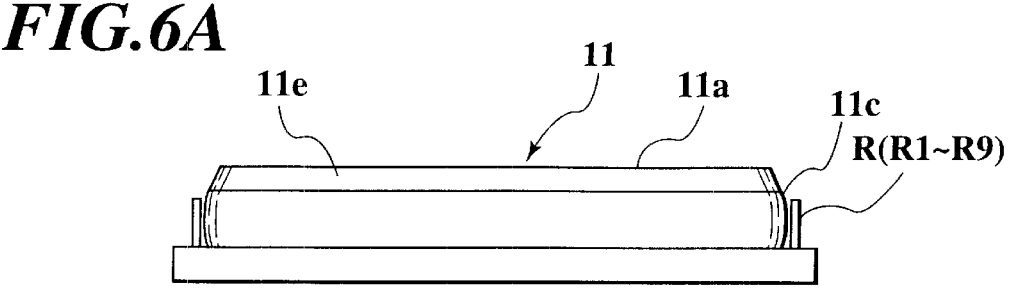
FIGS. 6A, 6B and 6C are schematic views of steps showing producing process of the metal belt of the belt-type continuously variable transmission by the circle jig shown in FIGS. 5A and 5B.
Figure 6B:
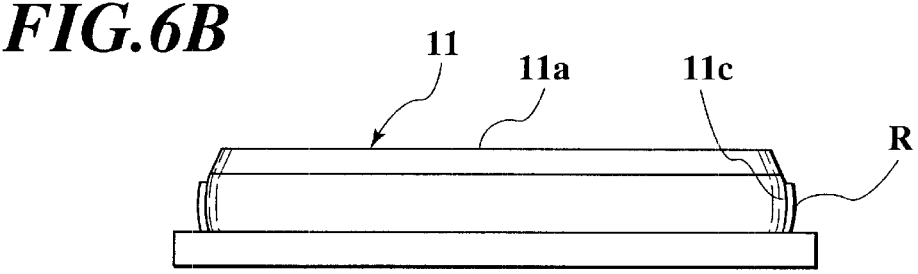
Figure 6C:
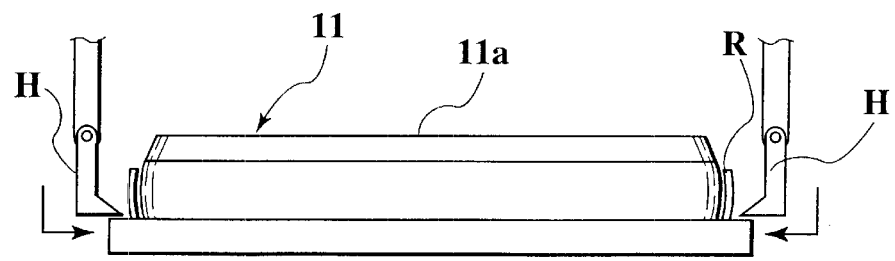
Figure 7:
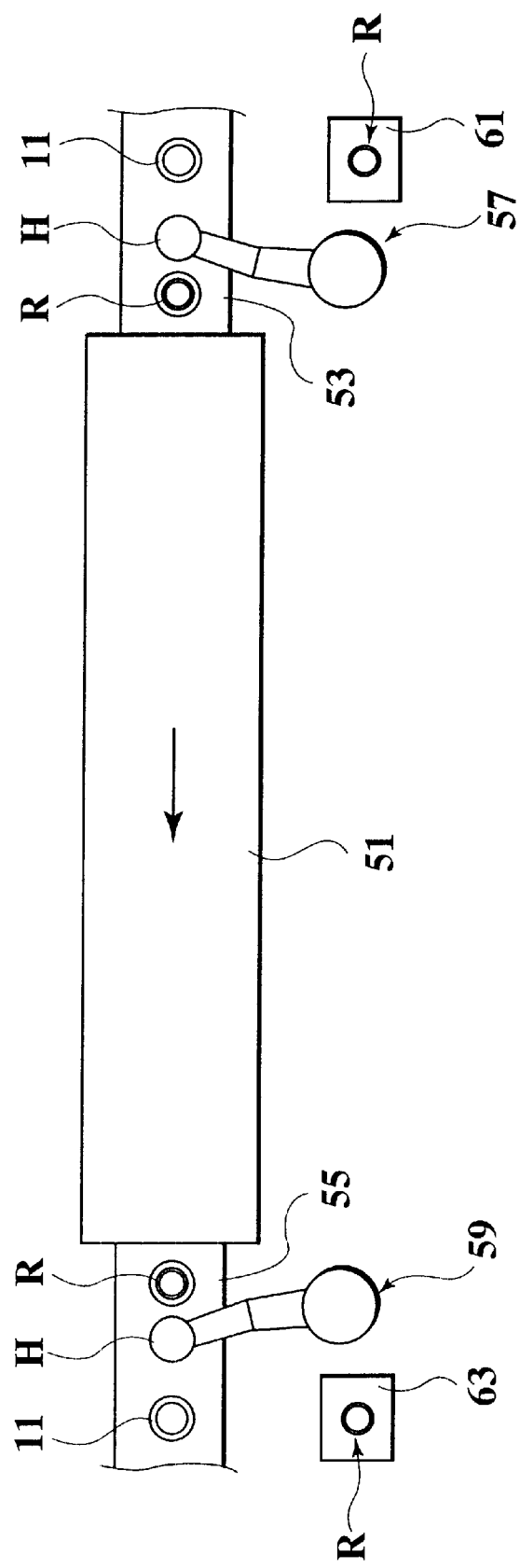
FIG. 7 is a schematic plan view showing a producing apparatus of the present invention.

The laminated blank rings R mounted to the jig body 11a of the circle jig 11 are transferred into the continuous furnace 51, and while the blank rings R pass therethrough, they are heated at 480° C. and subjected to the aging treatment, and the blank rings R are plastically deformed by the thermal expansion of the circle jig 11 as shown in FIG. 6B, and their diameters are increased and crowns each having a shape corresponding to the crown 11c of the circle jig 11 are formed.

After 6 hours during the circle jig 11 and the laminated blank rings R are heated in the continuous furnace 51 in such a manner that they are continuously passed through the furnace continuous 51, the laminated blank rings R become a, metal band R and are unloaded from the continuous furnace 51 by an unloading conveyer 55 and cooled. The diameter of the blank ring R is increased and the circle jig 11 is shrunk so that the metal band R is separated from the jig body 11a by a robot 59, then the blank rings Rare located on a stock table 63. More specifically, the metal band R is moved out from the circle jig 11 by the robot 59 having a hook H provided at its inner side with a claw, and the metal belt of the belt-type continuously variable transmission is obtained.

To the circle jig 11 from which the metal band R is removed, next blank rings R is mounted, and they circulate through the furnace in the same manner. Therefore, metal belts having the same shape and size are continuously produced at a high productivity.

The above producing apparatus can be modified such that the loaded circle jig 11 and the laminated blank rings R are heated in another furnace in such a manner that they are stopped and located in the furnace during 6 hours. Then after, the loaded the circle jig 11 and a metal band made of (become from) the laminated blank rings R are unloaded from the furnace by the same loading conveyer 53 which loaded the circle jig 11 and the former laminated blank rings R by reversed driving manner.

As specifically described above, according to a first aspect of the present invention, there is provided a producing method of a metal band of a metal belt for a belt-type continuously variable transmission, comprising the steps of: superposing a predetermined number of blank rings concentrically on one another to constitute a laminated blank rings;

fitting the laminated blank rings to an outer periphery of a circle jig made of material having higher thermal expansivity than that of the blank ring; heating the laminated blank rings together with the circle jig; and deforming the laminated blank rings plastically by thermal expansion of the circle jig.

According to the producing method of the metal band of the metal belt for the belt-type continuously variable transmission of the first aspect of the present invention, since the plastic deformation is applied to the laminated blank rings based on a difference in thermal expansivity between the circle jig and each of the blank rings, a diameter of the blank ring is increased in a true-circle manner by stress uniformly loaded from its inner peripheral side, and a clearance between the adjacent inner and outer rings is reduced. With this feature, when the blank rings are superposed in fitted to the circle jig, a tolerance range of difference between the outer periphery length and the inner periphery length of the adjacent inner and outer rings is largely increased as comparing with a conventional range of 11 $\mu$m or less (0 to 11 $\mu$m), and even if the outer periphery length of the inner ring is slightly longer than the inner periphery length of the outer ring for example, such a difference can be allowed.

Therefore, a range of selection of the blank rings is largely widened, and since the stocking term after the production of the blank rings is extremely shortened, the store place is unnecessary, or it is possible to reduce the store place, and the equipment costs and management cost are reduced. Further, the final size of the metal belt is determined by the size and the processing temperature of the circle jig, the precision of the size of the metal belt is enhanced by constantly keeping the size and the processing temperature of the circle jig.

According to a second aspect of the present invention, as it depends from the first aspect, the material of the circle jig is austenitic steel.

According to the producing method of the second aspect, since the material of the circle jig is austenitic steel such as austenitic based stainless steel or Ni—Cr based heat-resistance alloy steel, for example, the thermal expansivity is large and the plastic deformation applied to the blank ring is large.

According to a third aspect of the present invention, as it depends from the first second aspect, the material of the blank ring is maraging steel; and the blank ring fitted to the circle jig made of austenitic based stainless steel is heated to aging treatment temperature.

According to the producing method of the third aspect, the material of the blank ring is maraging steel, and the heating temperature coincides with the aging treatment temperature of the maraging steel. Therefore, a metal belt having a high strength can be obtained without increasing the processing steps or increasing the thermal treatment furnace.

According to a fourth aspect of the present invention, as it depends from one aspect among the first aspect to the third aspect, an outer peripheral surface of the circle jig against which the blank ring abuts is formed with a crown.

According to the producing method of the fourth aspect, since the outer peripheral surface of the circle jig is formed with the crown or with a convex, the blank ring is plastically deformed into a shape along the crown of the circle jig and thus, the crown is also formed easily on the metal band simultaneously.

According to a fifth aspect of the present invention, as it depends from one aspect among the first aspect to the fourth aspect, a plurality of sets of the laminated blank rings are set to a jig retainer having a plurality of the circle jigs; and the plurality of sets of the laminated blank rings and the plurality of the circle jigs are heated.

According to the producing method of the fifth aspect, the plurality of sets of blank rings are respectively fitted to the retainer having the plurality of circle jig and are heated, the number of processing steps per one heat is increased so that the producing efficiency of the metal belts is enhanced.

According to a sixth aspect of the present invention, as it depends from one aspect among the first aspect to the fourth aspect, a plurality of the circle jigs to which the laminated blank rings are set are heated in a furnace in such a manner that the plurality of the circle jigs to which the laminated blank rings are continuously passed through the furnace.

According to the producing method of the sixth aspect, the circle jig to which the blank ring is set is continuously passed through the furnace, thereby heating the blank ring the therefore, the producing efficiency of the metal band for a metal belt is further enhanced.

According to a seventh aspect of the present invention, there is provided a producing apparatus of a metal band of a metal belt for a belt-type continuously variable transmission, comprising: a circle jig having an outer periphery to be fitted with a laminated blank rings which are concentrically superposed on one another; and a furnace heating the laminated blank rings together with the circle jig, wherein the circle jig is made of material having higher thermal expansivity than that of the laminated blank rings, thereby deforming the laminated blank rings plastically by thermal expansion of the circle jig.

According to an eighth aspect of the present invention, as it depends from the seventh aspect, the material of the circle jig is austenitic steel.

According to a ninth aspect of the present invention, as it depends from the eighth aspect, the material of the blank ring is maraging steel; and the blank ring fitted to the circle jig made of austenitic based stainless steel is heated to aging treatment temperature.

According to a tenth aspect of the present invention, as it depends from the eighth or the ninth aspect, an outer peripheral surface of the circle jig against which the blank ring abuts is formed with a crown.

According to an eleventh aspect of the present invention, as it depends from one aspect among the seventh aspect to the tenth aspect, a plurality of sets of the laminated blank rings are set to a jig retainer having a plurality of the circle jigs; and the plurality of sets of the laminated blank rings and the plurality of the circle jigs are heated.

According to a twelfth aspect of the present invention, as it depends from one aspect among the seventh aspect to the tenth aspect, the producing apparatus of a metal belt for a belt-type continuously variable transmission, further comprising: a conveyer loading the circle jig together with the laminated blank rings into the furnace; and another conveyer unloading the circle jig together with the laminated blank rings from the furnace, wherein a plurality of the circle jigs to which the laminated blank rings are set are heated in a furnace in such a manner that the plurality of the circle jigs to which the laminated blank rings are continuously passed through the furnace, thereby the laminated blank rings are plastically by thermal expansion of the circle jig and become a metal band which is utilized for connecting a large number of metal blocks constituting the metal belt.

According to the above seventh to the above twelfth aspect of the present invention, the producing apparatus of a metal band of a metal belt for a belt-type continuously variable transmission results the same improvements as the producing method thereof.

While preferred embodiments of the present invention have been described using specific terms, such description is for illustrative purposes, and it is to be understood that changes and variations may be made without departing from the spirit or scope of the following claims.

What is claimed is:

1. A method of producing a metal band of a metal belt for a belt-type continuously variable transmission, comprising the steps of:

superposing a group of metal blank rings concentrically on one another to constitute laminated blank rings such that the grouped metal blank rings are laminated in a laminate manner, wherein the group of metal blank rings comprise predetermined members of metal blank rings and wherein each member among the predetermined members has a different inner and outer periphery lengths from inner and outer periphery lengths of the other members;

fitting the laminated blank rings to an outer periphery of a circle jig in a state keeping the laminated manner and in a slightly flexible state, wherein the circle jig is made of material having higher thermal expansivity than that of the laminated blank rings and wherein a circular length of the outer periphery of the circle jig is kept constant except for any change caused by thermal expansion;

heating the laminated blank rings and the circle jig, wherein the laminated blank rings are comprised of the predetermined members of blank rings in a state still keeping the laminated manner; and deforming each member of the metal blank rings plastically only by the different thermal expansivity between the circle jig and each member of the metal blank rings so as to enlarge each member of the metal blank rings so that each difference of length between an inner periphery length of one member among the members and an outer periphery length of another member located inwardly next to the one member is reduced, thereby producing the metal band, comprised of the predetermined members of the metal blank rings, in a fitting state.

2. The method of producing a metal band of a metal belt according to claim 1, wherein the material of the circle jig is austenitic steel.

3. The method of producing a metal band of a metal belt according to claim 2, wherein the material of the laminated blank rings is maraging steel; and the laminated blank rings fitted to the circle jig made of austenitic based stainless steel are heated to an aging treatment temperature.

4. The method of producing a metal band of a metal belt according to claim 3, wherein an outer peripheral surface of the circle jig against which the laminated blank rings abut is formed with a crown.

5. The method of producing a metal band of a metal belt according to claim 4, wherein a plurality of sets of the laminated blank rings are set to a jig retainer having a plurality of the circle jigs; and the plurality of sets of the laminated blank rings and the plurality of the circle jigs are heated.

6. The method of producing a metal band of a metal belt according to claim 5, wherein the plurality of the circle jigs to which the laminated blank rings are set are heated in a furnace in such a manner that the plurality of the circle jigs to which the laminated blank rings are set are continuously passed through the furnace.

7. The method of producing a metal band of a metal belt according to claim 1, wherein a plurality of the laminated blank rings are fitted to a plurality of the circle jigs; and the plurality of the laminated blank rings and the plurality of the circle jigs are simultaneously heated, thereby producing a plurality of the metal bands simultaneously.

8. The method of producing a metal band of a metal belt according to claim 7, wherein the material of the circle jig is austenitic steel.

9. The method of producing a metal band of a metal belt according to claim 8, wherein the material of the blank ring is maraging steel; and the blank ring fitted to the circle jig made of austenitic based stainless steel is heated to aging treatment temperature.

10. The method of producing a metal band of a metal belt according to claim 9, wherein an outer peripheral surface of the circle jig against which the blank ring abuts is formed with a crown.

11. The method of producing a metal band of a metal belt according to claim 10, wherein the plurality of sets of the laminated blank rings are set to a jig retainer having a plurality of the circle jigs; and the plurality of sets of the laminated blank rings and the plurality of the circle jigs are heated.

12. The method of producing a metal band of a metal belt according to claim 11, wherein the plurality of the circle jigs to which the laminated blank rings are set are heated in a furnace in such a manner that the plurality of the circle jigs to which the laminated blank rings are continuously passed through the furnace.

* * * * *